May 7, 1968  H. C. OVSHINSKY  3,381,539
LINEAR ACTUATOR
Filed Oct. 21, 1965  3 Sheets-Sheet 1
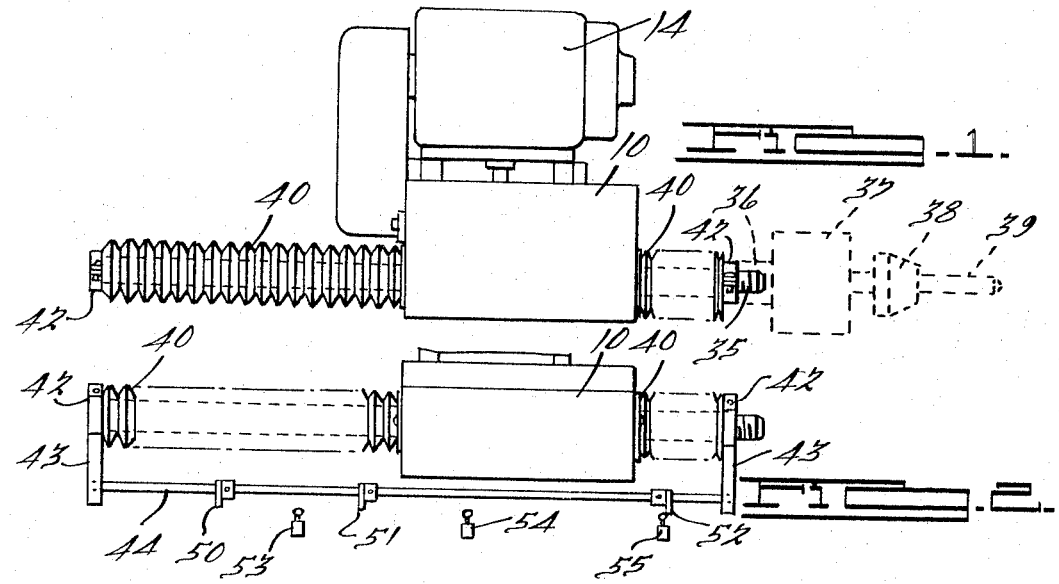
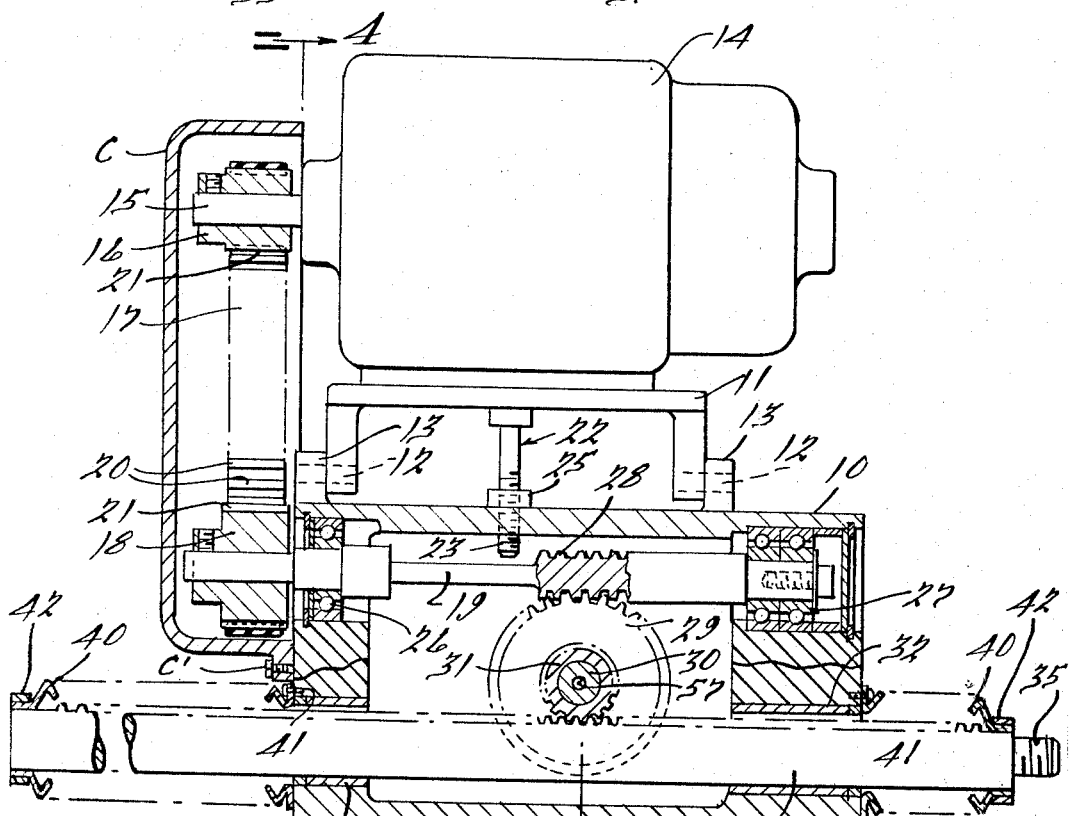
INVENTOR.
Herbert C. Ovshinsky
BY
Harness, Dickey & Pierce
ATTORNEYS.

May 7, 1968     H. C. OVSHINSKY     3,381,539
LINEAR ACTUATOR
Filed Oct. 21, 1965     3 Sheets-Sheet 2
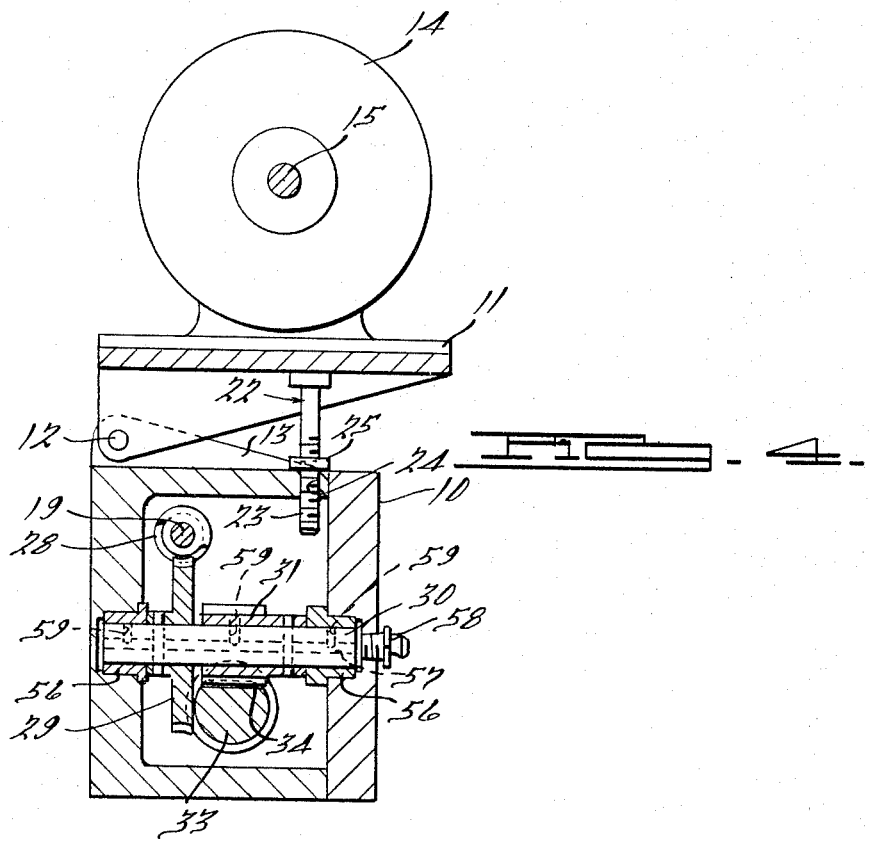
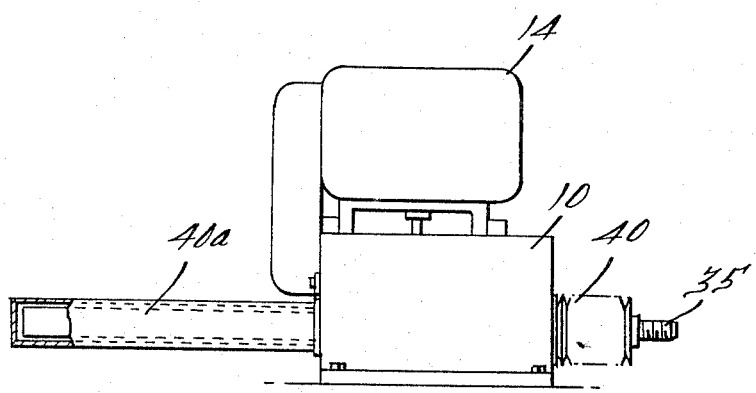
INVENTOR.
Herbert C. Ovshinsky
BY
Harness, Dickey & Pierce
ATTORNEYS.

May 7, 1968 H. C. OVSHINSKY 3,381,539
LINEAR ACTUATOR
Filed Oct. 21, 1965 3 Sheets-Sheet 3
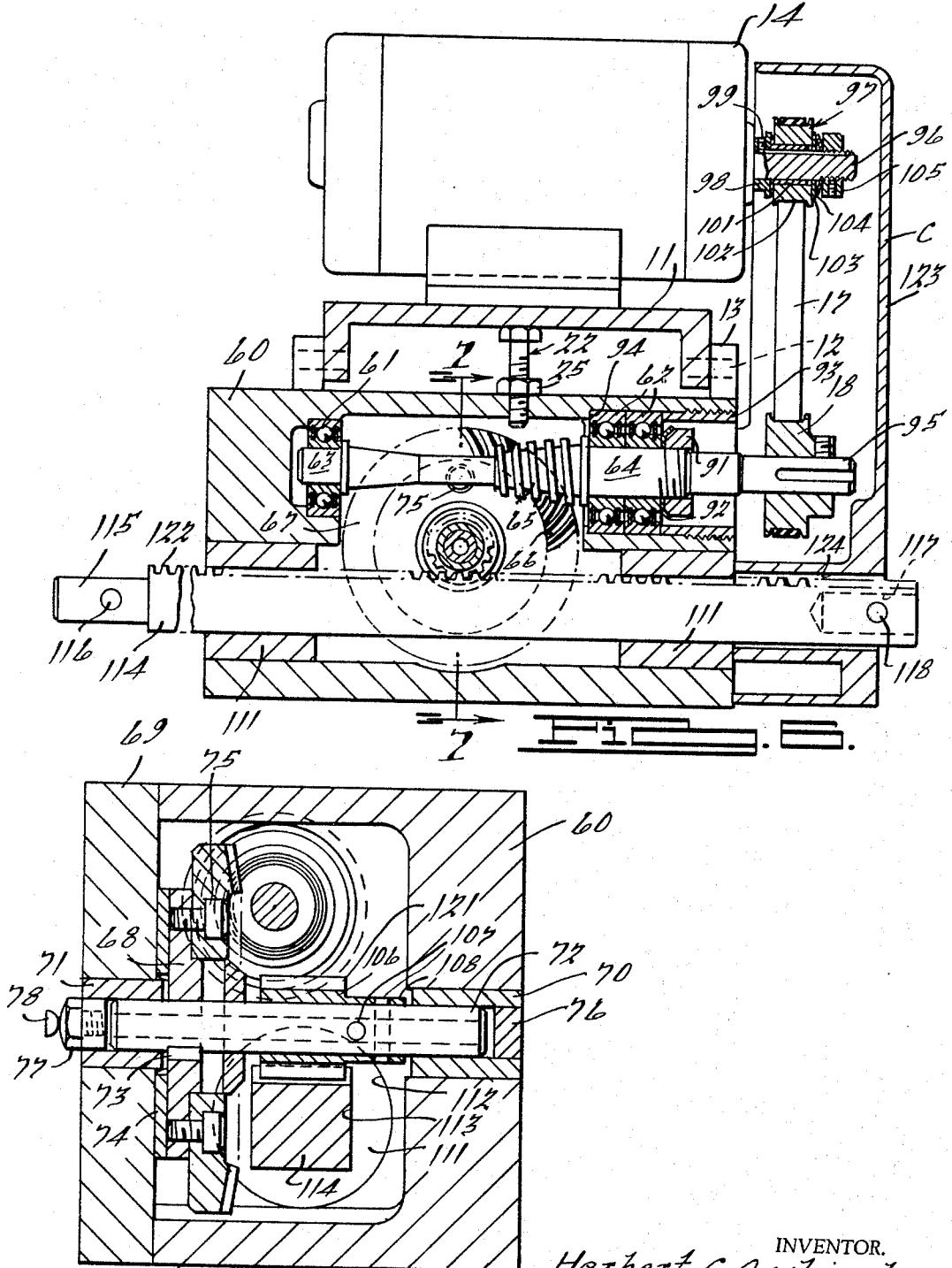
INVENTOR.
Herbert C. Ovshinsky
BY
Harness, Dickey & Pierce
ATTORNEYS

United States Patent Office 3,381,539
Patented May 7, 1968

3,381,539
LINEAR ACTUATOR
Herbert C. Ovshinsky, 15200 Leslie,
Oak Park, Mich. 48237
Filed Oct. 21, 1965, Ser. No. 499,458
4 Claims. (Cl. 74—89.14)

ABSTRACT OF THE DISCLOSURE

The device functions in the same manner as a fluid operated ram without the use of pressure fluid. The device has a shaft with teeth thereon which is reciprocated through a gear train by a reversing motor to apply a force in the same manner as the piston of a ram. The same action is obtained as that of a piston without the use of a pressure fluid.

---

An object of this invention is to provide a simple but effective device of this type which can be used in place of the usual hydraulic ram type machines which necessitate the use of a costly pump and tank for actuating the same.

Further objects of this invention are to provide a device of this type which is efficient, durable, and of simple construction, comprising a minimum number of parts whereby it may be economically manufactured and easily installed and operated.

The various objects and advantages, and the novel details of construction of one commercially practical embodiment of the invention, will become more apparent as this description proceeds, especially when considered in connection with the accompanying drawings, in which:

FIGURE 1 is a side elevation of a device constructed in accordance with this invention;

FIG. 2 is a fragmentary side elevation showing semi-diagrammatically the controls for the driving motor;

FIG. 3 is an enlarged sectional elevational view of the device;

FIG. 4 is a sectional view taken substantially on the plane indicated by line 4—4 in FIG. 3;

FIG. 5 is an elevational view similar to FIG. 1, showing a slightly modified form of construction;

FIG. 6 is a view of structure, similar to that illustrated in FIG. 3, showing another form of the invention, and FIG. 7 is a sectional view of the structure illustrated in FIG. 6, taken on the line 7—7 thereof.

Referring now to the drawings, the reference character 20 indicates a housing upon which is mounted a tiltable platform 11 pivotally connected at one end as at 12 to lugs 13 projecting from the housing 10.

Mounted upon the platform 11 is an electric motor 14 provided with a driving shaft 15. This shaft carries a driving gear 16 with which a positive drive belt 17 engages. The other end of the belt 17 engages a gear 18 on the end of a worm gear shaft 19. The positive drive belt 17 is provided with transversely extending tooth-like lugs 20 which engage the teeth 21 on the gears 16 and 18. Thus, there is a positive drive connection between the motor 14 and the shaft 19. In order to exclude foreign material therefrom, a cover C enclosing these parts is secured to the housing 10 as, for instance, by bolts or other fasteners C'; see FIGURE 3.

As stated heretofore, a platform 11 is pivotally mounted at one end as at 12 on the housing 10 and, in order to adjust the platform 11 to keep the belt 17 taut, there is provided an adjustable support 22 engaging the underside of the platform 11. The adjustable support 22 is in the form of a bolt having threads 23 thereon which engage a threaded aperture 24 in the housing 10. A lock nut 25 on the threaded portion 23 holds the adjustable support 22 in its adjusted position so that the platform 11 and motor 14 can be adjusted together with the driving gear 16 to hold the belt taut at all times.

The worm gear shaft 19 is mounted in ball bearings 26 and 27 in the housing 10. The shaft 19 is provided with a worm gear 28 which meshes with a worm gear wheel 29 on a shaft 30 which extends transversely of the housing 10, as seen by a comparison of FIGS. 3 and 4. Also mounted on the shaft 30 is a gear or pinion 31. Slidably mounted in the housing 10 in bearings 32 for reciprocation therein is a tool actating shaft 33. This shaft 33 is provided with teeth 34 which mesh with the teeth on the pinion 31. Thus, when the pinion 31 is rotated in one direction, the shaft 33 will be moved towards the right and when the pinion is rotated in the opposite direction, the shaft 33 will be moved towards the left.

As shown in FIG. 4, the shaft 30 has its ends mounted in bushings 56 carried by the housing 10. The shaft 30 may have an axially extending lubricant passageway 57 closed by a lubricant fitting 58 at one end thereof. Branch passageways 59 leading from the lubricant pasageway 57 supply lubricant to the bushings 56 and to the teeth of the gear 31 which engage the teeth 34 on the shaft 33.

The shaft 33 is provided with a threaded end 35 adapted to receive a cutting tool or the like (not shown). Or, as shown in dotted lines in FIG. 1, a rotary cutting tool may be attached to the end 35. Such a cutting tool may consist of a coupling 36 adapted to be connected to the threaded end 35 of the shaft 33 to secure to the shaft a motor 37, chuck 38, and cutting tool 39. Thus, the device of this invention may also be employed to control the movement of a rotary cutting tool.

The exposed ends of the shaft 33, as illustrated in FIGS. 1, 2 and 3, are provided with bellows-like enclosures 40 adapted to enclose the exposed ends of the shaft 33 and provide a seal therfor. It is typical of these bellows-like enclosures to expand and collapse as the shaft 33 is reciprocated to thus provide a protective seal therefor. The bellows 40 are preferably made of neoprene. One end of each bellows member is connected by fasteners 41 to the housing 10 and the outer ends of each bellows 40 are secured to the end of the reciprocating shaft 33 by a clamp 42. Thus, the exposed ends of the shaft 33 are protected at all times from dirt or other foreign matter.

Connected to the clamps 42 are depending arms 43 which support between them a rod 44 which moves with the shaft 33. While any suitable control means may be employed for starting and reversing the motor 14, the rod 44 forms part of one such control means which is semi-diagrammatically illustrated in FIG. 2 of the drawings.

The reference characters 50, 51 and 52 indicate switch actuating members adjustable on the rod 44 and the reference characters 53, 54 and 55 indicate switches in a control circuit for the motor whereby the motor may be driven in both forward and reverse directions. The motor is started by energizing the circuit thereto by a switch (not shown). The circuitry controlling the motor is such that when the control rod 44 moves to the right, as viewed in FIG. 2, the switch actuating member 50 will engage the switch 53 and reduce the speed of the motor during the final movement of the shaft 33 to the right. Thereupon, the movement of the shaft 33 is at a slower speed until the switch actuating member 51 operates the switch 54. This will reverse the motor and cause the shaft 33 and rod 44 to move in the opposite direction until the switch actuating member 52 engages the switch 55 to stop the motor and hence the movement of the shaft 33 and rod 44. Control circuits of this type are well known and hence the one shown semidiagrammatically in FIG. 2 will not be further described.

In FIG. 5, a slight modification is illustrated in which the bellows 40 at the left of the apparatus is replaced by a rigid tube-like enclosure 40a.

When the motor is started, it will drive the gear 16 which, in turn, will drive the belt 17 and the gear 18 on the shaft 19. This will rotate the shaft so that the worm gear 28 thereon will rotate the worm gear wheel 29. This will rotate the cross shaft 30 and the pinion 31 which is engaged with the teeth 34 on the shaft 33. This will move the shaft in one direction; for instance, to the right, as viewed in FIG. 3. When the motor 14 is reversed, the gearing just described will move the shaft 33 to the left. Thus, the shaft 33 is actuated to move a tool connected to the end 35 with a reciprocatory motion. Any suitable type tool may be connected to the end 35 of the shaft 33, or a tool having a rotary and reciprocating motion, as shown in dotted lines in FIG. 1, may be attached thereto. In either instance, the present invention provides a simple but effective means for converting a rotary motion into a reciprocating motion which, in turn, is imparted to the tool.

Referring to FIGS. 6 and 7, a further form of the invention is illustrated that wherein a housing 60 contains sets of bearings 61 and 62 to support the ends 63 and 64 of a pinion 65 of a Spiroid gear set manufactured by Illinois Tool Works, Inc. of Chicago. The pinion 65 has a thread which mates with teeth 66 on a gear 67 which is secured to a hub 68 by screws 75. The housing 60 has a cover plate 69 and both have sleeve bushings 70 and 71 respectively. The bushings support a hollow shaft 72 on which the hub 68 is secured in driving relation as by a key 73. A spacer thrust plate 74 is located between the hub and cover plate 69 retained centrally thereof by the bushing 71. The sleeve bushing 70 is sealed by a plug 76 and the sleeve bushing 71 is sealed by a plug 77 having a grease gun fitting 78 thereon. A nut 91 is threaded on the pinion end 64 to clamp the inner race of the bearings 62 against the end of the pinion 65 secured in position by a locking element 92. An externally threaded sleeve 93 secures the outer races of the bearings 62 against a shoulder 94 in the housing end. The pinion end 64 has an extending shaft portion 95 on which the gear pulley 18 is secured.

The shaft 96 of the motor 14 carries a slip gear or pulley 97 embodying a sleeve 98 which is secured to the shaft 96 as by the screw 99. A flange sleeve 101 is fixed to the sleeve 98 on which the pulley or gear element 102 is freely rotatable. A washer 103 engages the outer side of the gear or pulley element 102 urged thereagainst by dished spring washer 104, the tension of which is adjusted by a nut 105 threaded on the end of the sleeve 98. The friction between the flange of the sleeve 101 and the washer 103 produces a driving engagement between the gear or pulley element 102 and the sleeve 98 which is adjusted by the nut 105. Should the driven load become too great, the motor 14 will not stall but will continue to operate under a substantially maximum load condition.

A pinion 106 is secured on the shaft 74 by a pair of pins 107 which extend through the shaft and a pinion sleevelike extension 108. Cylindrical bushings 111 are mounted in cyilndrical apertures 112. The bushings 111 have square apertures 113 therein for the reception of a rack bar 114 which is square in section. The rack bars are made in standard lengths to produce a desirable degree of advancement, one end of which has a cylindrical extension 115 containing an aperture 116, the opposite end having a cylindrical recess 117 which receives end 115 of a second rack bar. The aperture 117 is intercepted by an aperture 118 which will align with the aperture 116.

A pin is employed to secure any number of standard lengths of rack bars 114 together to lengthen the degree of longitudinal movement obtainable from the device. The extending end 115 or the recess 117, or both, may have tool supporting apparatus with a matable end secured thereto in fixed relation by a pin through an aperture 116 or 118.

With this arrangement the motor drives through the slip gear or pulley 97, the belt 17, the gear or pulley 18, the pinion 65, and the gear 67 to drive the shaft 72. The shaft 72 drives the pinion 76, the teeth 121 of which are in engagement with the teeth 122 of the rack bar 114 to drive it longitudinally of its length. Since grease is provided within the housing 6 for the gears and for the bearings mounted therein, the protecting sleeves, mentioned hereinabove with regards to the structure of FIGS. 1 to 5 for encasing the ends of the rack bar, may be employed in a similar manner on the present device.

The present device provides two distinct advantages over that of FIGS. 1 to 5 in that a slip gear or pulley 97 will prevent the motor from stalling should too great a load be encountered by the rack bar 114. The use of the Spiroid gear provides a choice between sets of a given center distance so that a desired output speed is obtained. A wide range of driving speed for the rack 114 may be obtained not only by changing the relative diameter between the pulley gear 18 and the slip gear or pulley 97 but also by interchanging the pinion 65 and gear 67 having the same center spacing. It will be noted that the cover 123 extends substantially to the bottom of the housing 60 and is provided with an aperture 124 through which the rack bar 114 extends.

What is claimed is:

1. A device of the class described comprising, a housing, a driving motor supported on said housing, bushing means mounted on said housing having an opening between the ends thereof, a shaft reciprocally mounted in said bushing means, said shaft having teeth along one side thereof at said opening, a gear having teeth in mesh with the teeth of the shaft, and means for driving said gear from said motor.

2. A device of the class described comprising a housing having spaced bushings thereon, an adjustable shelf mounted on said housing, a driving motor supported by said shelf, a shaft rotatably mounted in said housing and having first gear means thereon, a positive drive belt connecting said motor to said gear means shaft, a longitudinally movable shaft reciprocally mounted in said bushings, said shaft having teeth along one side thereof, and a third shaft rotatably mounted in said housing having a second gear means in engagement with said first gear means and a third gear on said shaft having teeth meshing with the teeth on said longitudinally movable shaft to reciprocate the latter.

3. In a device of the class described, a housing having spaced bushings thereon, an adjustable shelf mounted on said housing, a driving motor supported by said shelf, a shaft rotatably mounted in said housing and having a worm thereon, pulleys on the shaft of said motor and on said worm shaft, a positive drive belt connecting the pulleys, means for adjusting said shelf to tighten said belt, a longitudinally movable shaft reciprocally mounted in said bushings, said shaft having teeth along one side thereof, means in said housing connecting said worm to the teeth on said longitudinally movable shaft to reciprocate the latter, and a worm wheel engaging said worm for driving said gear means.

4. In a device providing reciprocating motion, a housing, a first shaft rotatably mounted in said housing having a thread thereon, a second shaft disposed at right angles to said first shaft, a gear on said second shaft having teeth in mesh with said thread, a pinion gear on said second shaft, a rack bar having teeth that mesh with the teeth of the pinion gear, a motor on said housing having a shaft, a pulley on the motor shaft, a pulley on said first shaft, and a belt for interconnecting said pulleys.

References Cited

UNITED STATES PATENTS

| | | | |
|---|---|---|---|
| 2,470,985 | 5/1949 | Illsche | 74—89.14 X |
| 2,503,674 | 4/1950 | Ljunggren | 74—27 |
| 2,545,008 | 3/1951 | Senglet | 77—34.6 |
| 2,573,140 | 10/1951 | Heth | 74—29 |
| 2,902,891 | 9/1959 | Wollenhaupt | 77—34.6 |
| 3,071,989 | 1/1963 | Timm | 77—34.6 X |

FRED C. MATTERN, Jr., *Primary Examiner.*

CORNELIUS J. HUSAR, *Examiner.*